Feb. 26, 1952 P. P. KREISMAN, JR 2,586,834
RASPBERRY PICKER
Filed Nov. 25, 1949 4 Sheets-Sheet 1

INVENTOR
PETER P. KREISMAN, JR.
BY
McMorrow, Berman & Davidson
ATTORNEYS

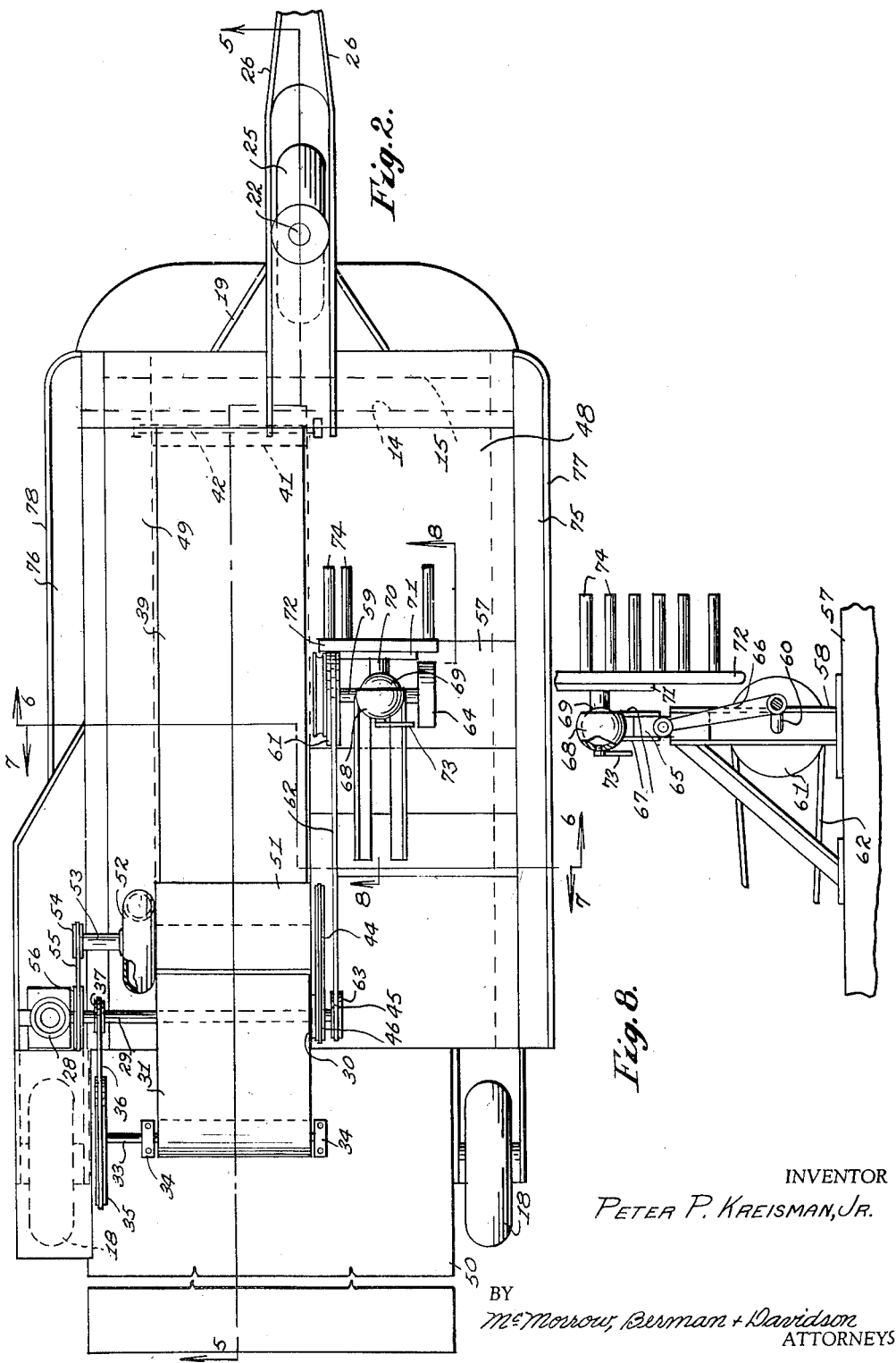

Feb. 26, 1952 P. P. KREISMAN, JR 2,586,834
RASPBERRY PICKER
Filed Nov. 25, 1949 4 Sheets-Sheet 3
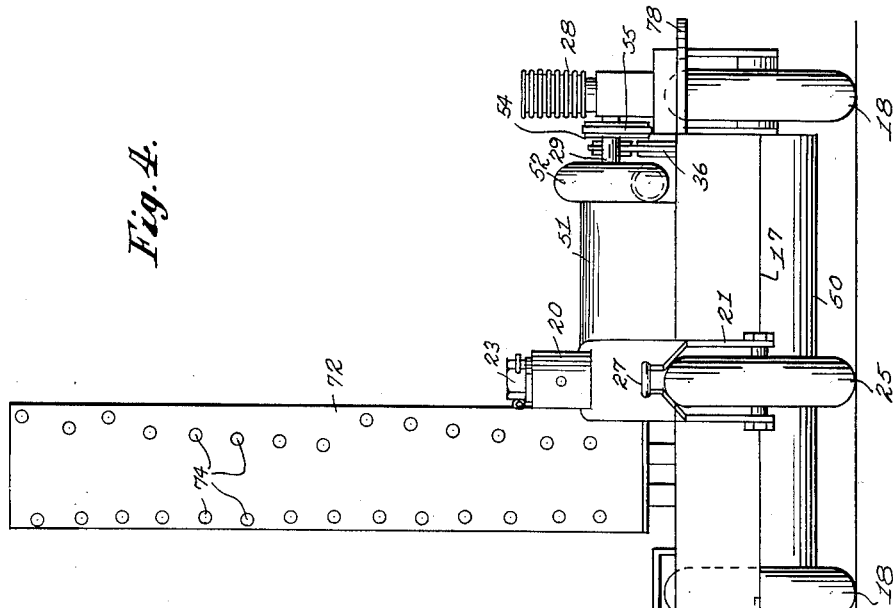
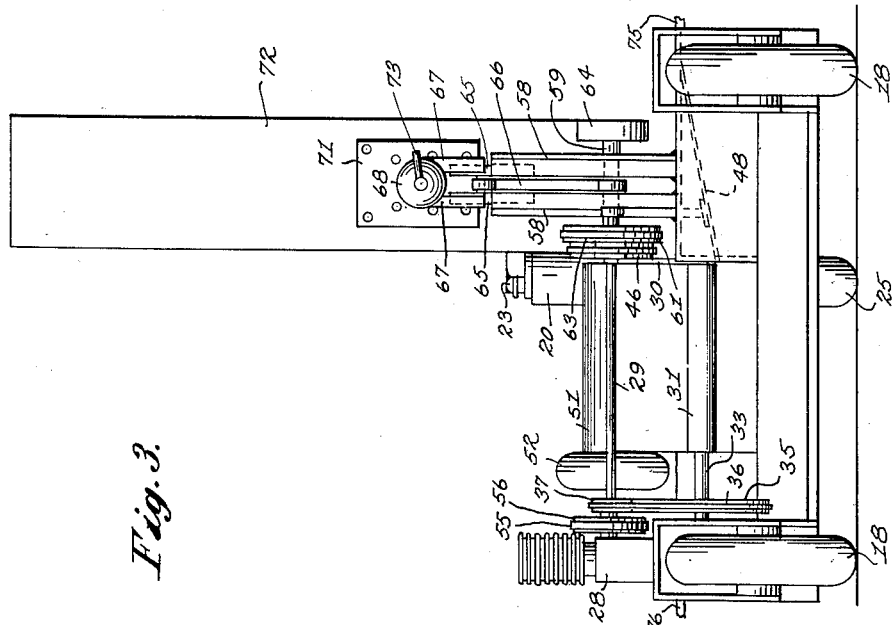
INVENTOR
PETER P. KREISMAN, JR.
BY
McMorrow, Berman & Davidson
ATTORNEYS Feb. 26, 1952 P. P. KREISMAN, JR 2,586,834
RASPBERRY PICKER
Filed Nov. 25, 1949 4 Sheets-Sheet 4
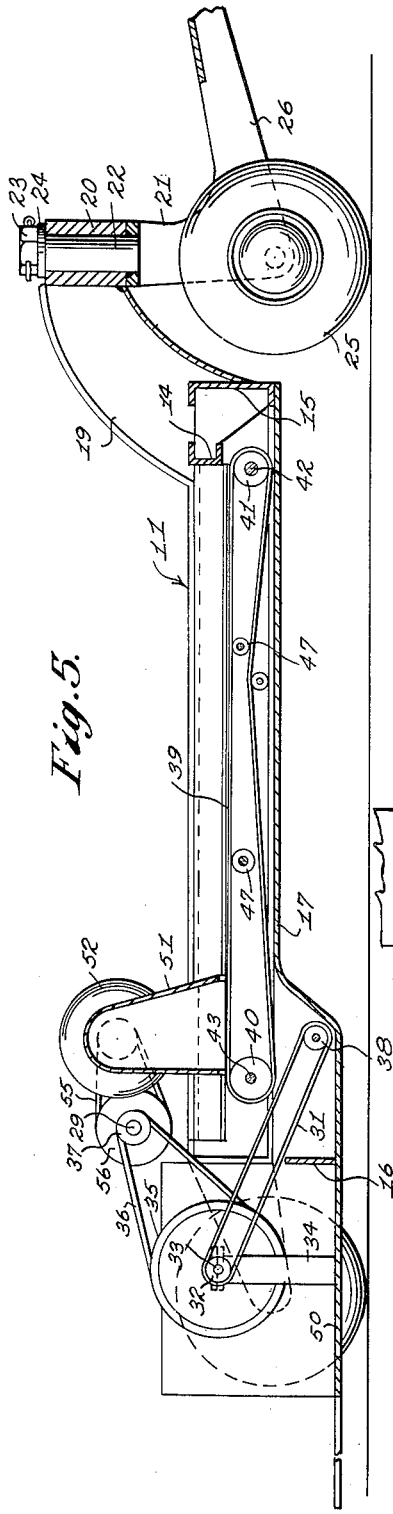
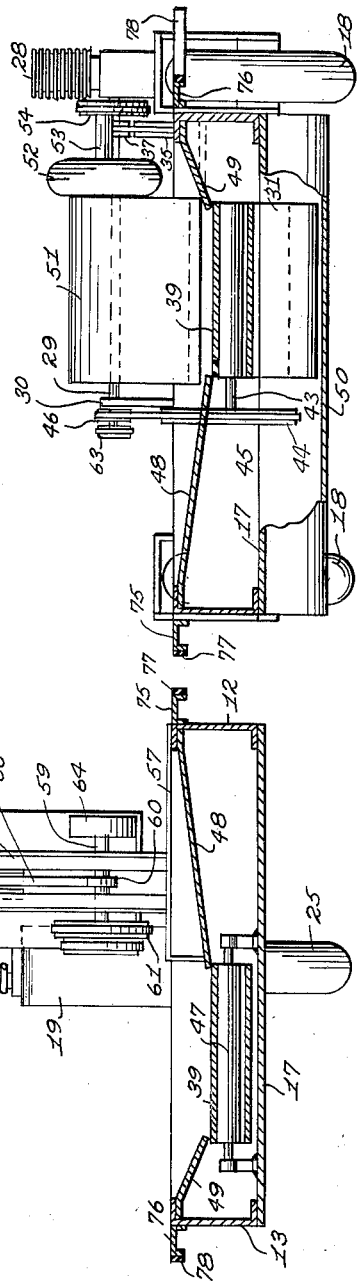
INVENTOR
PETER P. KREISMAN, JR.
BY McMorrow, Berman + Davidson
ATTORNEYS Patented Feb. 26, 1952

2,586,834

UNITED STATES PATENT OFFICE 2,586,834

RASPBERRY PICKER

Peter P. Kreisman, Jr., Puyallup, Wash.

Application November 25, 1949, Serial No. 129,363

3 Claims. (Cl. 56—328)

This invention relates to berry harvesting machines and more particularly to a berry harvesting machine of a type wherein the berries are shaken loose from the branches of the berry bushes mechanically and are then conveyed on the machine to a collection receptacle.

A main object of the invention is to provide a novel and improved harvesting machine for harvesting raspberries and the like, said machine being simple in construction, being easy to operate, separating the leaves and other loose material from the berries by an air current, and providing a means of harvesting berries rapidly and with a minimum amount of labor.

A further object of the invention is to provide an improved berry harvesting machine which is relatively inexpensive to fabricate, which involves only a few parts, which is easy to maintain in operating condition, and which provides a great saving in time and labor in harvesting raspberries and the like.

Further objects and advantages of the invention will become apparent from the following description and claims, and from the accompanying drawings, wherein:

Figure 2 is a top plan view of the raspberry harvesting machine of Figure 1.

Figure 3 is a rear end elevational view of the harvesting machine of Figure 1.

Figure 4 is a front elevational view of the harvesting machine of Figure 1.

Figure 5 is a longitudinal vertical cross sectional view of the machine taken on line 5—5 of Figure 2.

Figure 6 is a vertical transverse cross sectional view of the machine taken on line 6—6 of Figure 2.

Figure 7 is a vertical transverse cross sectional view of the machine taken on the line 7—7 of Figure 2.

Figure 8 is a fragmentary cross sectional detail view taken on the line 8—8 of Figure 2.

Figure 1:
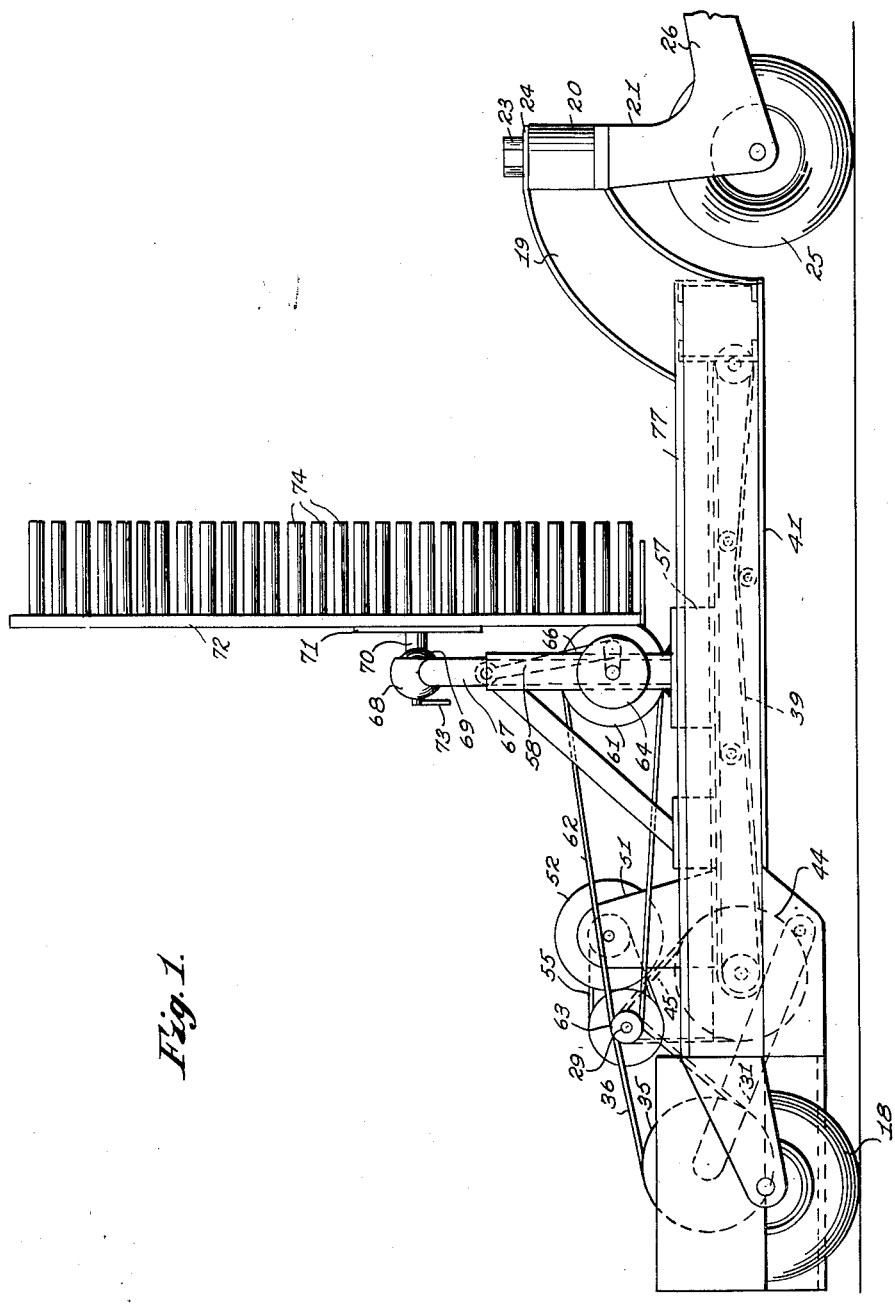
Figure 1 is a side elevational view of a raspberry harvesting machine constructed in accordance with the present invention.

Referring to the drawings, 11 generally designates the frame of the machine, said frame being generally rectangular in shape and comprising side channels 12, 13 connected at their forward ends by cross channels 14 and 15 and connected at their rear ends by a transverse plate 16. Designated at 17 is a bottom plate, secured to the various elements of the frame 11 at their bottom edges. The rear portion of the frame 11 is supported on rear wheels 18, 18 suitably journaled to the side portions of the frame. Centrally secured to the forward end of frame 11 is an arcuate bracket 19 formed at its end with a vertical sleeve bearing 20. Designated at 21 is a yoke member having a vertical bearing shaft 22 rotatably received in the sleeve bearing 20 and retained therein by a nut 23 and washer 24. Journaled in yoke member 21 is the front wheel 25. Yoke member 21 is formed with forwardly extending arms 26, 26 to the ends of which is secured a hitch bracket 27 for connecting the yoke member 21 to a tractor.

Mounted on the frame 11 adjacent the left rear wheel, as viewed in Figure 3, is a conventional internal combustion engine 28 having a shaft 29 which extends transversely over the frame and is rotatably supported in a bearing bracket 30. Designated at 31 is a rearwardly and upwardly extending endless conveyor belt. The rear end of belt 31 is supported on a roller 32 whose shaft 33 is journaled on brackets 34, 34 and carries a large pulley 35. Pully 35 is coupled by a belt 36 to a pulley 37 carried on shaft 29. The forward end of belt 31 is supported on a transverse roller 38 rotatably mounted on suitable brackets carried by frame 11.

Designated at 39 is a horizontal endless conveyor belt whose rear end overlies the forward end of belt 31, as shown in Figure 5, and which is supported at its ends on respective rollers 40 and 41. Roller 41 is mounted on a shaft 42 journaled transversely in brackets secured to the forward portion of frame 11. Roller 40 is secured on a shaft 43 journaled transversely in brackets secured to frame 11 and which carries a large pulley 44. Pulley 44 is coupled by a belt 45 to a pulley 46 carried on the end of shaft 29. The intermediate portions of the belt 39 are supported on transverse idler rollers 47.

As shown in Figures 6 and 7, downwardly and inwardly sloping plate members 48 and 49 are secured to the frame 11 on opposite sides of the conveyor belt 39, the inner margins of said plate members overlying the margins of the belt. The rear portion of the floor plate 17 is downwardly offset, as shown at 50, to define a platform upon which a receptacle may be placed in a position beneath the rear end of conveyor belt 31 so as to receive berries discharging from said conveyor belt 31.

Designated at 51 is a downwardly facing suction nozzle mounted over the rear portion of conveyor belt 39, as shown in Figure 5, the lower margins of the nozzle being spaced a short distance above the belt. Mounted on frame 11 is a suction blower 52 whose intake port is connected to suction nozzle 51. The shaft 53 of blower 52 carries a pulley 54 which is coupled by a belt 55 to a pulley 56 carried on engine shaft 29. The exhaust conduit of blower 52, not shown, discharges to the atmosphere at one side of the machine. Loose material such as dust, leaves, twigs, and other débris is removed by blower 52 from the harvested material carried rearwardly on conveyor belt 39, thereby cleansing the berries of said débris prior to the discharge of the berries onto the loading conveyor belt 31.

Secured on frame 11 laterally adjacent the intermediate portion of belt 39 is a horizontal platform 57. Mounted on platform 57 are opposed inwardly facing vertical channel bars 58, 58. Designated at 59 is a transverse shaft extending rotatably through the channel bars 58, 58 and formed with a U-shaped crank portion 60 which is rotatable in the space between the opposing edges of the channel bars. Secured on one end of shaft 59 is a pulley 61 which is coupled by a belt 62 to a pulley 63 carried by the end of engine shaft 29. Secured on the other end of shaft 59 is a flywheel 64. Slidably mounted in the upper portions of the opposing channel bars 58, 58 are blocks 65, 65 connected to the cross arm portion of crank 60 by a connecting rod 66, whereby the blocks 65 are reciprocated vertically responsive to the rotation of shaft 59.

Secured to the upper side portions of blocks 65 are opposing vertical bars 67, 67 and secured to the top ends of said bars is a forwardly facing ball socket 68. Adjustably received in socket 68 is a ball 69 constituting the termination of an arm 70. Secured to the end of arm 70 is a plate 71, and secured to plate 71 is a large elongated rectangular oak board 72. Threaded into socket 68 is a locking screw having an operating arm 73. By rotating the arm 73 the locking screw is caused to lockingly engage the ball 69, thereby securing the board 72 in a desired position of adjustment. Ordinarily board 72 is secured in a substantially vertical position.

Secured to board 72 are a large number of elongated spaced forwardly directed wooden pegs 74, the pegs being preferably arranged in irregular staggered relation, as shown in Figure 4.

In operation the machine is pulled forwardly along a row of raspberry bushes, the overhanging branches of the bushes being engaged by the pegs 74 on board 72. The board 72 is continuously oscillated vertically by the rotation of shaft 59. This shakes the berries off the bushes and said berries drop onto the sloping plate 48 and from thence gravitate onto the rearwardly moving conveyor belt 39. The berries are cleaned of débris by the suction blower 52 as said berries move beneath the suction nozzle 51. The berries are then deposited onto the loading conveyor belt 31, whereby they are discharged from the loading conveyor into a receptacle positioned beneath the rear end of the belt 31.

Secured to the longitudinal sides of the frame 11 are respective fenders 75 and 76 to the outer margins of which are secured respective rubber bumpers 77 and 78. The rubber bumpers 77 and 78 prevent bruising and scraping of the raspberry bushes as the machine moves along the row of bushes during the harvesting procedure.

Although a specific embodiment of a raspberry harvesting machine has been disclosed in the foregoing description, it is to be understood that various modifications within the spirit of the invention may occur to those skilled in the art. Therefore, it is intended that no limitations be placed on the invention except as defined by the scope of the appended claims.

What is claimed is:

1. In a berry-harvesting machine, a mobile frame, a horizontally disposed endless conveyor extending inwardly from one end of said frame and terminating adjacent to and spaced from the other end thereof and rotatably supported thereon, an inclined endless conveyor having one end extending beneath the terminating end of said horizontally disposed endless conveyor and having the other end spaced above said frame and rotatably supported thereon, motive means including a rotatable drive shaft operatively connected to said horizontally disposed and inclined conveyors for effecting the movement of said conveyors in a direction to carry berries from said one end of said frame toward said other end thereof, downwardly and inwardly sloping plate members extending along opposite sides of said horizontally disposed endless conveyor and carried by said frame and having the side edges adjacent the last named conveyor overlying the latter, a support positioned contiguous to one of said plate members intermediate the ends thereof and mounted on said frame for vertical reciprocatory movement, means operatively connecting said support to said drive shaft for actuation in response to the rotary movement of the latter, and berry-combing means carried by said support.

2. In a berry-harvesting machine, a mobile frame, a horizontally disposed endless conveyor extending inwardly from one end of said frame and terminating adjacent to and spaced from the other end thereof and rotatably supported thereon, an inclined endless conveyor having one end extending beneath the terminating end of said horizontally disposed endless conveyor and having the other end spaced above said frame and rotatably supported thereon, motive means including a rotatable drive shaft operatively connected to said horizontally disposed and inclined conveyors for effecting the movement of said conveyors in a direction to carry berries from said one end of said frame toward said other end thereof, downwardly and inwardly sloping plate members extending along opposite sides of said horizontally disposed endless conveyor and carried by said frame and having the side edges adjacent the last named conveyor overlying the latter, a support positioned contiguous to one of said plate members intermediate the ends thereof and mounted on said frame for vertical reciprocatory movement, means operatively connecting said support to said drive shaft for actuation in response to the rotary movement of the latter, berry-combing means carried by said support and mounted on the latter for universal movement, and manually actuated means operatively connected to said support and berry-combing means for holding the latter in select positions of its universal movement.

3. In a berry-harvesting machine, a mobile frame, a horizontally disposed endless conveyor extending inwardly from one end of said frame and terminating adjacent to and spaced from the other end thereof and rotatably supported thereon, an inclined endless conveyor having one end extending beneath the terminating end of said horizontally disposed endless conveyor and having the other end spaced above said frame and rotatably supported thereon, motive means including a rotatable drive shaft operatively connected to said horizontally disposed and inclined conveyors for effecting the movement of said conveyors in a direction to carry berries from said one end of said frame toward said other end thereof, downwardly and inwardly sloping plate members extending along opposite sides of said horizontally disposed endless conveyor and carried by said frame and having the side edges adjacent the last named conveyor overlying the latter, a support positioned contiguous to one of the plate members intermediate the ends thereof and mounted on said frame for vertical reciprocatory movement, means operatively connecting said support to said drive shaft for actuation in response to the rotary movement of the latter, berry-combing means carried by said support, a suction blower carried by said frame, and an intake nozzle connected to said suction blower and having its orifice in overlying spaced relation with respect to the terminating end adjacent portion of said horizontally disposed conveyor.

PETER P. KREISMAN, JR.

REFERENCES CITED

The following references are of record in the file of this patent:

UNITED STATES PATENTS

| Number | Name | Date |
|---|---|---|
| 15,533 | Sprague | Aug. 12, 1856 |
| 845,958 | Leidel | Mar. 5, 1907 |
| 2,373,426 | Spafford | Apr. 10, 1945 |